United States Patent
Oguro et al.

(10) Patent No.: US 12,097,770 B2
(45) Date of Patent: Sep. 24, 2024

(54) VEHICLE CONTROL APPARATUS

(71) Applicant: SUBARU CORPORATION, Tokyo (JP)

(72) Inventors: Chihiro Oguro, Tokyo (JP); Tejun Kin, Tokyo (JP)

(73) Assignee: SUBARU CORPORATION, Tokyo (JP)

(*) Notice: Subject to any disclaimer, the term of this patent is extended or adjusted under 35 U.S.C. 154(b) by 279 days.

(21) Appl. No.: 17/567,573

(22) Filed: Jan. 3, 2022

(65) Prior Publication Data

US 2022/0242251 A1 Aug. 4, 2022

(30) Foreign Application Priority Data

Jan. 29, 2021 (JP) ................................ 2021-012557

(51) Int. Cl.
*B60L 15/20* (2006.01)

(52) U.S. Cl.
CPC .......... *B60L 15/20* (2013.01); *B60L 2240/12* (2013.01); *B60L 2240/423* (2013.01); *B60L 2250/26* (2013.01)

(58) Field of Classification Search
CPC ................ B60L 15/20; B60L 2240/12; B60L 2240/423; B60L 2250/26; B60L 7/10; B60L 7/18; B60L 7/26; B60T 8/32; B60T 8/3275
See application file for complete search history.

(56) References Cited

U.S. PATENT DOCUMENTS 8,903,618 B2 * 12/2014 Lu ..................... B60T 8/3275
701/70
2016/0137100 A1 5/2016 Nishida et al.
(Continued)

FOREIGN PATENT DOCUMENTS

| JP | 2001-296309 A | 10/2001 |
| JP | 2004-136731 A | 5/2004 |
| JP | 2005-145328 A | 6/2005 |

(Continued)

OTHER PUBLICATIONS

Office Action dated Jun. 25, 2024, from corresponding JP Application No. 2021-012557, 6 pages.

*Primary Examiner* — Navid Z. Mehdizadeh
*Assistant Examiner* — Shelley Marie Osterhout
(74) *Attorney, Agent, or Firm* — Rimon P.C.

(57) ABSTRACT

A vehicle control apparatus controls a traveling motor coupled to wheels. The vehicle control apparatus includes a torque setting unit and a motor control unit. The torque setting unit sets a first target torque and a second target torque as target torques of the traveling motor. The first target torque changes based on an accelerator operation performed by a vehicle's driver. The second target torque changes more gradually than the first target torque. The motor control unit controls the traveling motor based on the first target torque or the second target torque. When the vehicle is moved forward without the accelerator operation, the torque setting unit sets the first target torque and the second target torque to a regenerative side. When the vehicle having been stopped is moved forward without the accelerator operation, the motor control unit controls the traveling motor based on the first target torque.

17 Claims, 6 Drawing Sheets

(56) References Cited

U.S. PATENT DOCUMENTS

2016/0347202 A1\* 12/2016 Sawada .................. B60L 15/20
2018/0154797 A1\* 6/2018 Sawada ............... B60L 15/2018

FOREIGN PATENT DOCUMENTS

| JP | 2006-137324 A | 6/2006 |
| JP | 2006-175941 A | 7/2006 |
| JP | 2016-096657 A | 5/2016 |
| JP | 2017-85846 A | 5/2017 |

\* cited by examiner

VEHICLE CONTROL APPARATUS

CROSS-REFERENCE TO RELATED APPLICATIONS

The present application claims priority from Japanese Patent Application No. 2021-012557 filed on Jan. 29, 2021, the entire contents of which are hereby incorporated by reference.

BACKGROUND

The technology relates to a vehicle control apparatus that controls a traveling motor coupled to the wheels.

Vehicles including electric vehicles and hybrid vehicles have traveling motors coupled to the wheels. The traveling motor of the vehicle is controlled on the basis of an accelerator operation or a brake operation performed by a driver. Reference is made to Japanese Unexamined Patent Application Publication (JP-A) Nos. 2004-136731, 2006-175941, 2017-85846, and 2006-137324.

SUMMARY

An aspect of the technology provides a vehicle control apparatus to be applied to a vehicle. The vehicle control apparatus is configured to control a traveling motor of the vehicle coupled to at least one wheel of the vehicle. The vehicle control apparatus includes a torque setting unit and a motor control unit. The torque setting unit is configured to set a first target torque and a second target torque as target torques of the traveling motor. The first target torque is configured to change on the basis of an accelerator operation performed by a driver who drives the vehicle. The second target torque is configured to change more gradually than the first target torque. The motor control unit is configured to control the traveling motor on the basis of the first target torque or the second target torque. In a case where the vehicle is moved forward without the accelerator operation, the torque setting unit is configured to set the first target torque and the second target torque to a regenerative side out of the regenerative side and a power-running side. In a case where the vehicle having been stopped is moved forward without the accelerator operation, the motor control unit is configured to control the traveling motor on the basis of the first target torque.

An aspect of the technology provides a vehicle control apparatus to be applied to a vehicle. The vehicle control apparatus is configured to control a traveling motor of the vehicle coupled to at least one wheel of the vehicle. The vehicle control apparatus includes circuitry. The circuitry is configured to set, as target torques of the traveling motor, a first target torque configured to change on the basis of an accelerator operation performed by a driver who drives vehicle, and a second target torque configured to change more gradually than the first target torque. The circuitry is configured to control the traveling motor on the basis of the first target torque or the second target torque. The circuitry is configured to set the first target torque and the second target torque to a regenerative side out of the regenerative side and a power-running side in a case where the vehicle is moved forward without the accelerator operation. The circuitry is configured to control the traveling motor on the basis of the first target torque in a case where the vehicle having been stopped is moved forward without the accelerator operation.

BRIEF DESCRIPTION OF THE DRAWINGS

The accompanying drawings are included to provide a further understanding of the technology and are incorporated in and constitute a part of this specification. The drawings illustrate example embodiments and, together with the specification, serve to explain the principles of the technology.

DETAILED DESCRIPTION

Figure 1:
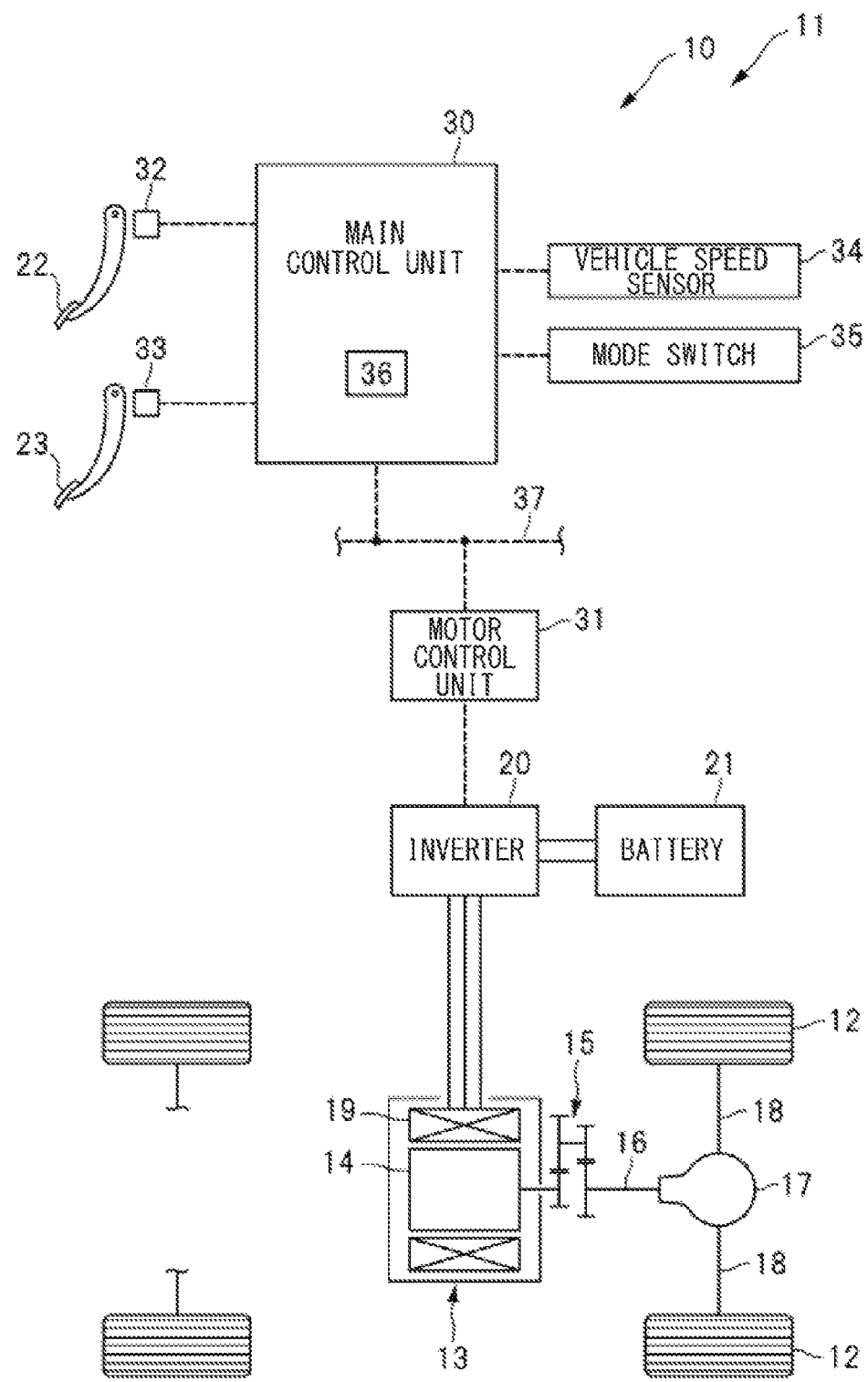
FIG. 1 is a diagram illustrating an exemplary configuration of a vehicle including a vehicle control apparatus according to an example embodiment of the technology.

As a traveling motor has a significantly high responsivity, the motor torque is gradually changed by performing a smoothing process or the like on a target torque to suppress acceleration shocks or deceleration shocks. Unfortunately, the method of gradually changing the motor torque by the smoothing process can complicate the control processing on the motor at the time of rear-end contact of another vehicle.

It is desirable to provide a vehicle control apparatus that appropriately controls the traveling motor at the time of rear-end contact of another vehicle.

In the following, some example embodiments of the technology are described in detail with reference to the accompanying drawings. Note that the following description is directed to illustrative examples of the disclosure and not to be construed as limiting to the technology. Factors including, without limitation, numerical values, shapes, materials, components, positions of the components, and how the components are coupled to each other are illustrative only and not to be construed as limiting to the technology. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same reference numerals to avoid any redundant description. In addition, elements that are not directly related to any embodiment of the technology are unillustrated in the drawings.

[Exemplary Vehicle Configuration]

FIG. 1 illustrates an exemplary configuration of a vehicle (hereinafter also referred to as an own vehicle) 11 including a vehicle control apparatus 10 according to an example embodiment of the technology. As illustrated in FIG. 1, the vehicle 11 may include a motor generator 13 coupled to wheels 12. In one embodiment, the motor generator 13 may serve as a "traveling motor". The motor generator 13 may include a rotor 14 to which the wheels 12 are coupled via a gear train 15, a motor output shaft 16, a differential mechanism 17, and a wheel drive shaft 18. The motor generator 13 may also include a stator 19 to which an inverter 20 is coupled. To the inverter 20, a battery 21 may be coupled. The battery 21 maybe a lithium-ion battery, for example.

The vehicle control apparatus 10 may include a main control unit 30 and a motor control unit 31. The main control unit 30 may include a processor and a memory, for example. The motor control unit 31 may include a processor and a memory, for example. In one embodiment, the motor control unit 31 may serve as a "motor control unit". To the main control unit 30, various sensors such as an accelerator sensor 32, a brake sensor 33, and a vehicle speed sensor 34 may be coupled. The accelerator sensor 32 may detect the amount of depression of an accelerator pedal 22 (hereinafter referred to as an accelerator position Acc). The brake sensor 33 may detect the amount of depression of a brake pedal 23. The vehicle speed sensor 34 may detect a vehicle speed V that is a traveling speed of the vehicle 11. Additionally, a mode switch 35 may be coupled to the main control unit 30. The mode switch 35 may be operated to set a regenerative mode (e.g., a low generative mode or a high generative mode).

The main control unit 30 may include a torque setting unit 36. The torque setting unit 36 may set a required torque Tm1 and a control torque Tm2. As described below, the required torque Tm1 may be a target torque of the motor generator 13, and may be determined on the basis of the accelerator position Acc, for example. In one embodiment, the required torque Tm1 may serve as a "first target torque". The control torque Tm2 may be a target torque determined by performing a smoothing process on the required torque Tm1. In one embodiment, the required torque Tm2 may serve as a "second target torque". As the control torque Tm2 is a target torque determined by performing the smoothing process on the required torque Tm1, the control torque Tm2 may change more gradually than the required torque Tm1.

The main control unit 30 may send the control torque Tm2 to the motor control unit 31. The motor control unit 31 may generate a drive signal for the inverter 20 on the basis of the control torque Tm2. On the basis of the drive signal, the inverter 20 may be controlled to convert DC power received from the battery 21 into AC power and supply the AC power to the motor generator 13. The motor generator 13 may be thereby controlled toward the control torque Tm2. As described above, the motor generator 13 may be controlled on the basis of the control torque Tm2 except for during rear-end contact braking control described below. The main control unit 30 and the motor control unit 31 may be communicably coupled to each other via an in-vehicle network 37. The in-vehicle network 37 may be a controller area network (CAN), for example.

[Setting of Required Torque Tm1]

Figure 2:
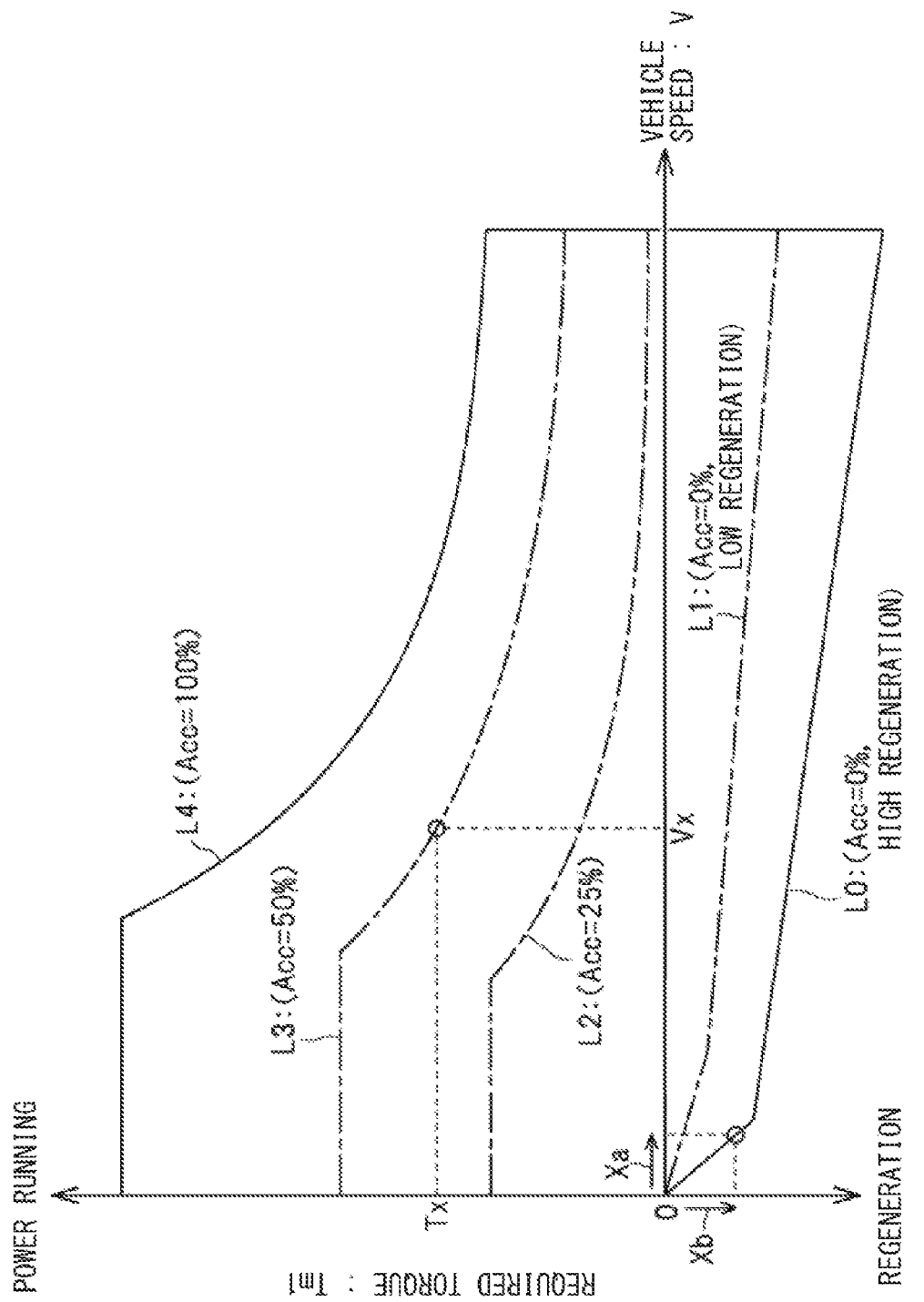
FIG. 2 is an exemplary torque map illustrating a required torque.

The torque setting unit 36 in the main control unit 30 may determine the required torque Tm1 of the motor generator 13 on the basis of the vehicle speed V, the accelerator position Acc, and regenerative mode information. FIG. 2 illustrates an exemplary torque map indicating the required torque Tm1. As illustrated in FIG. 2, the torque map may have characteristic lines L1 to L4 indicating the target torques Tm1 for the respective accelerator positions Acc. For example, when the accelerator position Acc is 0%, the target torque command value Tm1 may be set on the basis of the characteristic lines L0 and L1, and when the accelerator position Acc is 25%, the target torque command value Tm1 may be set on the basis of the characteristic line L2. Likewise, when the accelerator position Acc is 50%, the target torque command value Tm1 may be set on the basis of the characteristic line L3, and when the accelerator position Acc is 100%, the target torque command value Tm1 may be set on the basis of the characteristic line L4. For example, in a case where the accelerator position Acc is 50% and where the vehicle speed V is "Vx", the target torque command value Tm1 may be set to "Tx".

The vehicle 11 illustrated in the drawings may be driven in a regenerative mode while coasting with the accelerator pedal being released. The regenerative mode may include a low generative mode and a high generative mode. In the low generative mode, the motor generator 13 may be controlled at a low regenerative torque. In the high generative mode, the motor generator 13 may be controlled at a high regenerative torque. Thus, the torque map may have the characteristic lines L1 and L0 to be selected when the accelerator position Acc is 0%. The characteristic line L1 may be selected when the regenerative mode is set to the low generative mode, while the characteristic line L0 may be selected when the regenerative mode is set to the high generative mode. In other words, the required torque Tm1 may be set on the basis of the characteristic line L1 while the vehicle 11 is coasting in the low generative mode, and the required torque Tm1 may be set on the basis of the characteristic line L0 while the vehicle 11 is coasting in the high generative mode. As described above, while the vehicle 11 is coasting, i.e., moving forward without an accelerator operation, the target torque Tm1 may be set to the regenerative side, as illustrated by the characteristic lines L0 and L1.

Although the torque map illustrated in FIG. 2 has the five characteristic lines L0 to L4 for simplifying the explanation, the number of the characteristic lines should not be limited to five. Alternatively, the number of the characteristic lines of the torque map may be six or greater.

[Setting of Control Torque Tm2]

Setting of the control torque Tm2 performed by the torque setting unit 36 in the main control unit 30 will now be described. As the motor generator 13 has a significantly high responsivity, controlling the motor generator 13 on the basis of the required torque Tm1 can give an acceleration shock or a deceleration shock to the driver. To address such a concern, the torque setting unit 36 in the main control unit 30 may perform the smoothing process on the required torque Tm1 to set the control torque Tm2. The motor control unit 31 may receive the control torque Tm2 from the main control unit 30 and control the motor generator 13 on the basis of the control torque Tm2 via the inverter 20. As described above, when the vehicle 11 is caused to travel with an accelerator operation, the motor control may be performed on the basis of the control torque Tm2. This increases or decreases the motor torque without making the driver feel strange.

Figure 3:
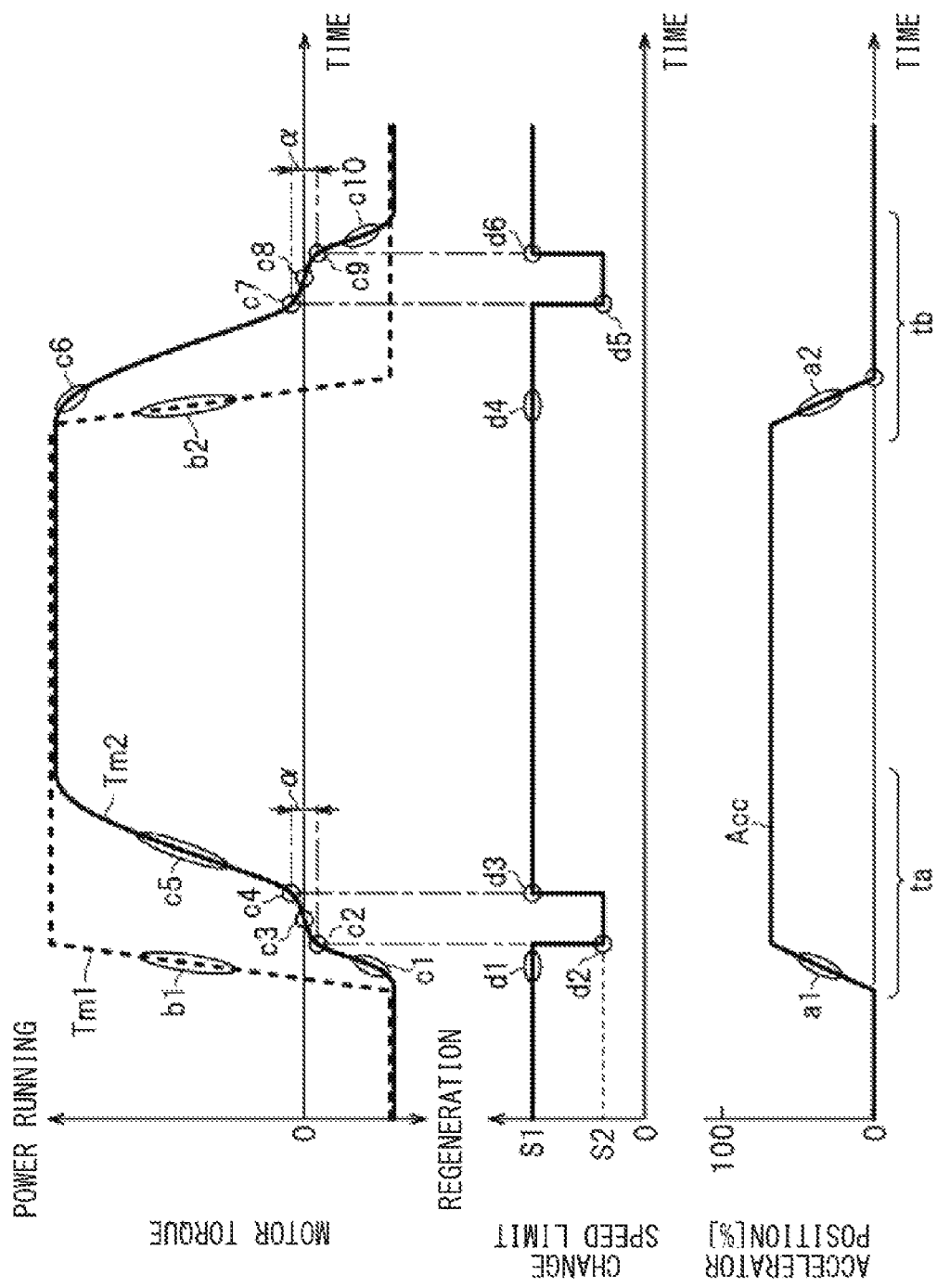
FIG. 3 is a chart illustrating exemplary conditions for setting a control torque.

FIG. 3 illustrates exemplary setting of the control torque Tm2. When the accelerator position Acc is increased by an accelerator operation performed by the driver in time to as indicated by a reference numeral a1 in FIG. 3, the required torque Tm1 may change from the regenerative side to the power-running side with the increase in the accelerator position Acc, as indicated by a reference numeral b1. Additionally, the control torque Tm2 used to control the motor generator 13 may gradually change toward the power-running side following the required torque Tm1, as indicated by a reference numeral c1. At this time, the change speed limit of the control torque Tm2 may be set to a predetermined change speed limit S1, as indicated by a reference numeral d1. In other words, the change speed of the control torque Tm2 being controlled toward the required torque Tm1 may be limited so as not to exceed the change speed limit S1.

When the control torque Tm2 changing toward zero reaches a predetermined range a around zero as indicated by a reference numeral c2, the change speed limit of the control torque Tm2 may be lowered from the change speed limit S1 to a change speed limit S2, as indicated by a reference numeral d2. Then, the change speed of the control torque Tm2 passing through zero may be limited so as not to exceed the change speed limit S2. In other words, when the control torque Tm2 passes through zero, the change speed of the control torque Tm2 may be set lower than the change speed having been set immediately before.

This allows the control torque Tm2 to gradually change as indicated by a reference numeral c3 at the timing when the control torque Tm2 passes through zero, that is, the timing when the teeth of the gear train 15 and the differential mechanism 17 engaging each other are switched, suppressing the shock generated when the motor torque switches from the regenerative side to the power-running side. After the control torque Tm2 passes through zero and exits from the predetermined range α around zero as indicated by a reference numeral c4, the change speed limit of the control torque Tm2 may be raised to the change speed limit S1 again, as indicated by a reference numeral d3. Then, the control torque Tm2 used to control the motor generator 13 may gradually change following the required torque Tm1, as indicated by a reference numeral c5.

When the accelerator position Acc is decreased by releasing the accelerator operation by the driver in time tb as indicated by a reference numeral a2 in FIG. 3, the required torque Tm1 may change from the power-running side to the regenerative side with the decrease in the accelerator position Acc, as indicated by a reference numeral b2. Additionally, the control torque Tm2 used to control the motor generator 13 may gradually change toward the regenerative side following the required torque Tm1, as indicated by a reference numeral c6. At this time, the change speed limit of the control torque Tm2 may be set to the predetermined change speed limit S1, as indicated by a reference numeral d4. In other words, the change speed of the control torque Tm2 being controlled toward the required torque Tm1 may be limited so as not to exceed the change speed limit S1.

When the control torque Tm2 changing toward zero reaches the predetermined range a around zero as indicated by a reference numeral c7, the change speed limit of the control torque Tm2 may be lowered from the change speed limit S1 to a change speed limit S2, as indicated by a reference numeral d5. Then, the change speed of the control torque Tm2 passing through zero may be limited so as not to exceed the change speed limit S2. In other words, when the control torque Tm2 passes through zero, the change speed of the control torque Tm2 may be set lower than the change speed having been set immediately before.

This allows the control torque Tm2 to gradually change as indicated by a reference numeral c8 at the timing when the control torque Tm2 passes through zero, that is, the timing when the teeth of the gear train 15 and the differential mechanism 17 engaging each other are switched, suppressing the shock generated when the motor torque switches from the power-running side to the regenerative side. After the control torque Tm2 passes through zero and exits from the predetermined range a around zero as indicated by a reference numeral c9, the change speed limit of the control torque Tm2 may be raised to the change speed limit S1 again, as indicated by a reference numeral d6. Then, the control torque Tm2 used to control the motor generator 13 may gradually change following the required torque Tm1, as indicated by a reference numeral c10.

[Rear-end Contact Braking Control]

Figure 4:
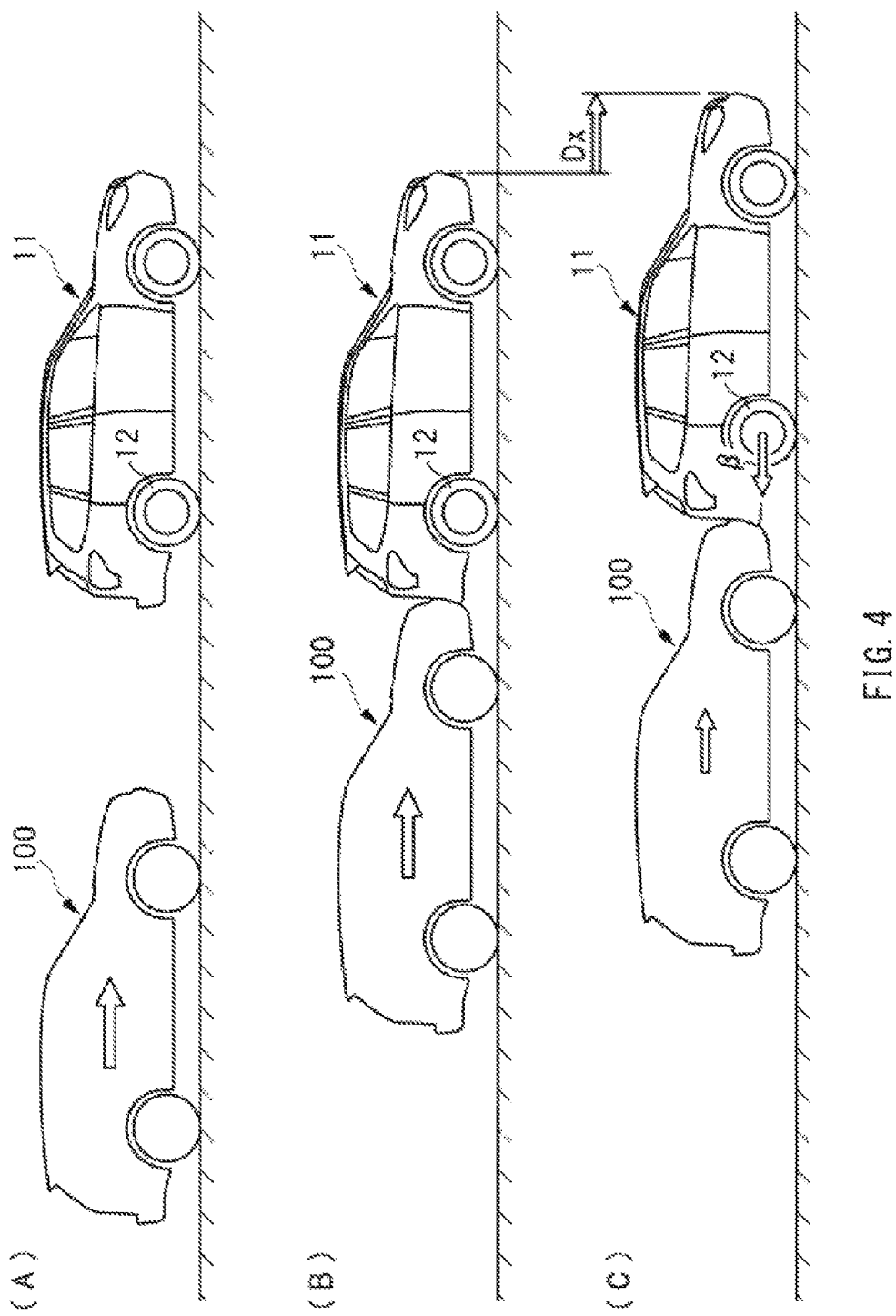
FIG. 4 is a diagram illustrating an exemplary situation where another vehicle makes rear-end contact with an own vehicle being stopped.

FIG. 4 illustrates an exemplary condition where another vehicle 100 makes rear-end contact with the own vehicle 11 being stopped. When the other vehicle 100 traveling behind the own vehicle 11 makes the rear-end contact with the own vehicle 11 as illustrated in Parts (A) and (B) of FIG. 4, the own vehicle 11 is pushed forward in a movement distance Dx as illustrated in Part (C) of FIG. 4. The movement distance Dx generated at the time of the rear-end contact has been required to shorten to avoid chain contact of vehicles. To address such a concern, the vehicle control apparatus 10 according to the present example embodiment executes rear-end contact braking control described below to shorten the movement distance Dx of the own vehicle 11 generated at the time of rear-end contact of the other vehicle.

[Flowchart]

Figure 5:
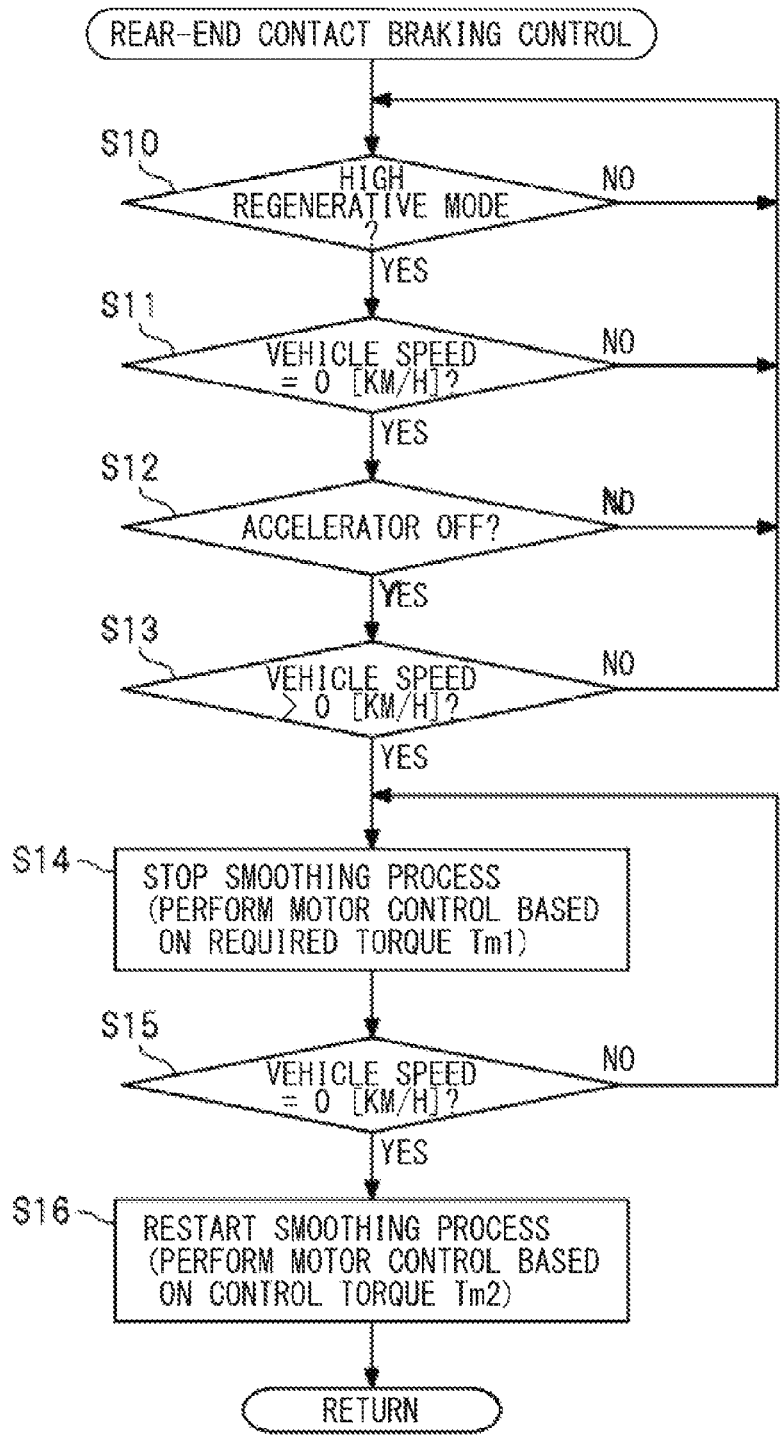
FIG. 5 is a flowchart illustrating an exemplary procedure for executing rear-end contact brake control.

FIG. 5 is a flowchart illustrating an exemplary procedure for the rear-end contact braking control. As illustrated in FIG. 5, it may be determined in Step S10 whether the regenerative mode set while the vehicle 11 is coasting is the high generative mode. In the high generative mode, which is also referred to as a common pedal mode, a high regenerative torque may be generated while the vehicle 11 is coasting. Thus, it is possible to stop the vehicle 11 without depressing the brake pedal 23 in the high generative mode. That is, it is possible to stop the vehicle 11 without the driver's braking operation in the high generative mode.

If it is determined in Step S10 that the high-generative mode is set (Step S10: YES), the procedure may proceed to Step S11. In Step S11, it may be determined whether the vehicle speed is 0 [km/h]. If it is determined in Step S11 that the vehicle speed is 0 [km/h] (Step S11: YES), the procedure may proceed to Step S12. In Step S12, it may be determined if the accelerator operation is OFF. If it is determined in Step S12 that the accelerator operation is OFF (Step S12: YES), the procedure may proceed to Step S13. In Step S13, it may be determined whether the vehicle speed is higher than 0 [km/h].

If it is determined in Step S13 that the vehicle speed is higher than 0 [km/h], the vehicle 11 having been stopped may start moving forward in the high generative mode without the accelerator operation. In other words, if it is determined in Step S13 that the vehicle speed is higher than 0 [km/h], the own vehicle 11 may be pushed forward by the other vehicle making the rear-end contact with the vehicle 11, as illustrated in Part (C) of FIG. 4. In this case, the procedure may proceed to Step S14. In Step S14, the smoothing process on the required torque Tm1 may be stopped, and the motor generator 13 may be controlled on the basis of the required torque Tm1. This quickly raises the regenerative torque of the motor generator 13 to apply the brake to the vehicle 11 using the regenerative torque transmitted to the wheels 12, as illustrated by an arrow β in Part (C) of FIG. 4.

After the brake is applied to the vehicle 11 using the regenerative torque as described above, it may be determined in Step S15 whether the vehicle speed is equal to 0 [km/h]. If it is determined in Step S15 that the vehicle speed is higher than 0 [km/h] (in Step S15: NO), the vehicle 11 may keep being moved forward by the rear-end contact of the other vehicle 100. The procedure may thus return to Step S14 to continue stopping the smoothing process and controlling the motor generator 13 on the basis of the required torque Tm1. In contrast, if it is determined in Step S15 that the vehicle speed is equal to 0 [km/h] (Step S15: YES), the vehicle 11 may be stopped from moving forward by the rear-end contact of the other vehicle 100. The procedure may thus proceed to Step S16. In Step S16, the smoothing process may be performed on the required torque Tm1 again, and the motor generator 13 may be controlled on the basis of the control torque Tm2.

[Timing Chart]

Figure 6:
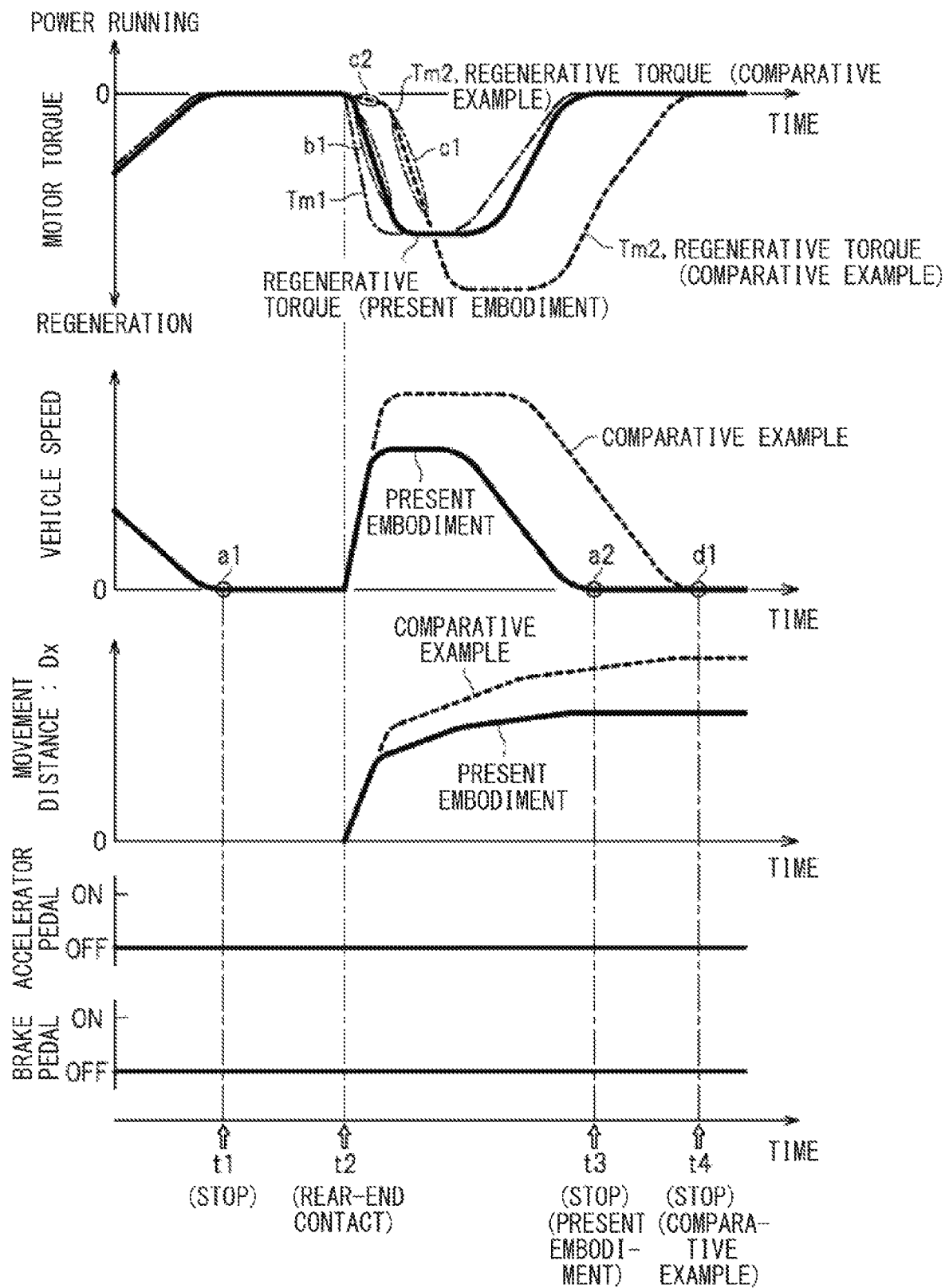
FIG. 6 is a timing chart illustrating exemplary conditions for executing the rear-end contact brake control.

FIG. 6 is a timing chart illustrating an exemplary operation of the rear-end contact braking control. In the example illustrated in FIG. 6, the accelerator pedal 22 is in an "OFF" state when the accelerator operation is not performed by the driver, while the accelerator pedal 22 is in an "ON" state when the accelerator operation is performed by the driver. Additionally, the brake pedal 23 is in an "OFF" state when the braking operation is not performed by the driver, while the brake pedal 23 is in an "ON" state when the braking operation is performed by the driver.

As illustrated in FIG. 6, the vehicle 11 decelerated by releasing the accelerator pedal may be stopped at time t1, as indicated by a reference numeral a1. As the high regenerative mode is executed in the example illustrated in FIG. 6, the vehicle 11 may be stopped without a braking operation. Thereafter, at time t2, the vehicle speed may be increased by the rear-end contact of the other vehicle 100, and the required torque Tm1 of the motor generator 13 may be thereby set to the regenerative side. That is, when the vehicle 11 having been stopped is moved forward without an accelerator operation as indicated by an arrow Xa in FIG. 2, the required torque Tm1 may be set to the regenerative side, as indicated by an arrow Xb in FIG. 2.

As the vehicle 11 having been stopped starts moving forward without an accelerator operation at the time t2, the smoothing process on the required torque Tm1 may be cancelled, and the regenerative control of the motor generator 13 may be performed on the basis of the required torque Tm1, as described above. This quickly raises the regenerative torque or the actual torque of the motor generator 13, as indicated by a reference numeral b1, quickly stopping the forward movement of the vehicle 11 caused by the rear-end contact at time t3. as indicated by a reference numeral a2.

In contrast, in a comparative example in which the regenerative control of the motor generator 13 is performed on the basis of the control torque Tm2 at the time of rear-end contact of another vehicle, the control torque Tm2 or the regenerative torque of the motor generator 13 is gradually raised as indicated by a reference numeral c1, and the forward movement of the vehicle 11 caused by the rear-end contact of the other vehicle is gradually stopped at time t4, as indicated by a reference numeral d1. If the smoothing process is performed on the required torque Tm1 in the comparative example, the change speed of the control torque Tm2 is limited to a large extent around zero as indicated by a reference numeral c2. This can raise the control torque Tm2 or the regenerative torque at a delayed timing.

[Conclusion]

As described above, when the vehicle 11 having been stopped is moved forward without an accelerator operation, the vehicle control apparatus 10 according to the example embodiment controls the motor generator 13 on the basis of the required torque Tm1. This quickly raises the regenerative torque of the motor generator 13, quickly stopping the forward movement of the vehicle 11 caused by the rear-end contact of another vehicle. Further, when the vehicle 11 having been stopped is moved forward by an accelerator operation, the vehicle control apparatus 10 according to the example embodiment controls the motor generator 13 on the basis of the control torque Tm2. This gradually changes the motor torque, causing the vehicle 11 to travel without making the driver feel strange.

In the example illustrated in FIG. 5, the motor generator 13 may be controlled on the basis of the required torque Tm1 when the vehicle 11 having been stopped is moved forward by rear-end contact of another vehicle while the high regenerative mode is selected. However, this example is non-limiting. In another example, the motor generator 13 may be controlled on the basis of the required torque Tm1 when the vehicle 11 having been stopped is moved forward by rear-end contact of another vehicle while the low regenerative mode is selected. Further, in the example illustrated in FIG. 6, the motor generator 13 may be controlled on the basis of the required torque Tm1 when the vehicle 11 having been stopped is moved forward by rear-end contact of another vehicle while the braking operation is not performed by the driver. However, this example is non-limiting. In another example, the motor generator 13 may be controlled on the basis of the required torque Tm1 when the vehicle 11 having been stopped is moved forward by rear-end contact of another vehicle while the braking operation is performed by the driver. In still another example, the motor generator 13 may be controlled on the basis of the required torque Tm1 when the vehicle 11 having been stopped is moved forward by rear-end contact of another vehicle while a non-illustrated electric braking system is operating.

The technology should not be limited to the foregoing example embodiments, and various modifications and application examples may be made without departing from the scope of the gist of the technology. In at least one of the foregoing example embodiments, the vehicle 11 including the vehicle control apparatus 10 may be an electric vehicle that includes a traveling motor as a sole drive source. However, this example is non-limiting. Alternatively, the vehicle 11 including the vehicle control apparatus 10 may be a hybrid vehicle that includes both a traveling motor and an engine as power sources. Further, in at least one of the foregoing example embodiments, the main control unit 30 may serve as the torque setting unit, and the motor control unit 31 may serve as the motor control unit. However, this example is non-limiting. Alternatively, another controller may serve as the torque setting unit or the motor control unit. Further, in at least one of the foregoing example embodiments, the control torque Tm2 that is gradually changed by limiting the change speed may be set through the smoothing process performed on the required torque Tm1. However, this example is non-limiting. The control torque Tm2 may be set by another method.

According to the foregoing example embodiment of the technology, the motor control unit controls the traveling motor on the basis of the first target torque when the vehicle having been stopped is moved forward without an accelerator operation. Accordingly, it is possible to appropriately control the traveling motor at the time of rear-end contact of another vehicle.

One or more of the torque setting unit 36 and the motor control unit 31 illustrated in FIG. 1 are implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the torque setting unit 36 and the motor control unit 31. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the torque setting unit 36 and the motor control unit 31 illustrated in FIG. 1.

The invention claimed is:

1. A vehicle control apparatus to be applied to a vehicle including a traveling motor of the vehicle coupled to at least one wheel, the vehicle control apparatus comprising:
a torque setting unit configured to set a first target torque and a second target torque as target torques of the traveling motor, wherein the target torques are set to either zero, a positive value, or a negative value, wherein the traveling motor generates a driving torque to move forward the vehicle when the target torques are set to the positive value, wherein the traveling motor generates a braking torque to decelerate the vehicle that is moving forward when the target torques are set to the negative value, wherein the first target torque changes based on an accelerator operation performed by a driver who drives the vehicle, and wherein the second target torque changes more gradually than the first target torque; and
a motor control unit configured to control the traveling motor on a basis of the first target torque or the second target torque, wherein
the torque setting unit is configured to set the first target torque and the second target torque to the negative value in a case where the vehicle moves forward without the accelerator operation, and
the motor control unit is configured to control the traveling motor on a basis of the first target torque in a case where the vehicle having been stopped is moved forward without the accelerator operation.

2. The vehicle control apparatus according to claim 1, wherein
the torque setting unit is configured to set the second target torque by performing a smoothing process on the first target torque.

3. The vehicle control apparatus according to claim 2, wherein,
in a case where the second target torque changing toward the negative value or the positive value passes through zero, the torque setting unit is configured to set a change speed of the second target torque such that the change speed is lower than when set immediately before.

4. The vehicle control apparatus according to claim 3, wherein
the motor control unit is configured to control the traveling motor on the basis of the first target torque in a case where the vehicle having been stopped is moved forward while neither a braking operation nor the accelerator operation is performed by the driver.

5. The vehicle control apparatus according to claim 4, wherein,
in a case where the vehicle having been stopped is moved forward by the accelerator operation performed by the driver, the motor control unit is configured to control the traveling motor on a basis of the second target torque.

6. The vehicle control apparatus according to claim 3, wherein, in a case where the vehicle having been stopped is moved forward by the accelerator operation performed by the driver, the motor control unit is configured to control the traveling motor on a basis of the second target torque.

7. The vehicle control apparatus according to claim 2, wherein
the motor control unit is configured to control the traveling motor on the basis of the first target torque in a case where the vehicle having been stopped is moved forward while neither a braking operation nor the accelerator operation is performed by the driver.

8. The vehicle control apparatus according to claim 7, wherein,
in a case where the vehicle having been stopped is moved forward by the accelerator operation performed by the driver, the motor control unit is configured to control the traveling motor on a basis of the second target torque.

9. The vehicle control apparatus according to claim 2, wherein,
in a case where the vehicle having been stopped is moved forward by the accelerator operation performed by the driver, the motor control unit is configured to control the traveling motor on a basis of the second target torque.

10. The vehicle control apparatus according to claim 1, wherein,
in a case where the second target torque changing toward the negative value or the positive value passes through zero, the torque setting unit is configured to set a change speed of the second target torque such that the change speed is lower than when set immediately before.

11. The vehicle control apparatus according to claim 10, wherein
the motor control unit is configured to control the traveling motor on the basis of the first target torque in a case where the vehicle having been stopped is moved forward while neither a braking operation nor the accelerator operation is performed by the driver.

12. The vehicle control apparatus according to claim 11, wherein,
in a case where the vehicle having been stopped is moved forward by the accelerator operation performed by the driver, the motor control unit is configured to control the traveling motor on a basis of the second target torque.

13. The vehicle control apparatus according to claim 10, wherein,
in a case where the vehicle having been stopped is moved forward by the accelerator operation performed by the driver, the motor control unit is configured to control the traveling motor on a basis of the second target torque.

14. The vehicle control apparatus according to claim 1, wherein
the motor control unit is configured to control the traveling motor on the basis of the first target torque in a case where the vehicle having been stopped is moved forward while neither a braking operation nor the accelerator operation is performed by the driver.

15. The vehicle control apparatus according to claim 14, wherein,
in a case where the vehicle having been stopped is moved forward by the accelerator operation performed by the driver, the motor control unit is configured to control the traveling motor on a basis of the second target torque.

16. The vehicle control apparatus according to claim 1, wherein, in a case where the vehicle having been stopped is moved forward by the accelerator operation performed by the driver, the motor control unit is configured to control the traveling motor on a basis of the second target torque.

17. A vehicle control apparatus to be applied to a vehicle including a traveling motor of the vehicle coupled to at least one wheel, the vehicle control apparatus comprising circuitry configured to set a first target torque and a second target torque as target torques of the traveling motor, wherein the target torques are set to either zero, a positive value, or a negative value, wherein the traveling motor generates a driving torque to move forward the vehicle when the target torques are set to the positive value, wherein the traveling motor generates a braking torque to decelerate the vehicle that is moving forward when the target torques are set to the negative value, wherein the first target torque changes based on an accelerator operation performed by a driver who drives the vehicle, and wherein the second target torque changes more gradually than the first target torque, control the traveling motor on a basis of the first target torque or the second target torque, set the first target torque and the second target torque to the negative value in a case where the vehicle moves forward without the accelerator operation, and control the traveling motor on a basis of the first target torque in a case where the vehicle having been stopped is moved forward without the accelerator operation.

* * * * *